Aug. 28, 1945.   T. R. SMITH   2,383,692
PIPE OR TUBE COUPLING
Filed March 29, 1943
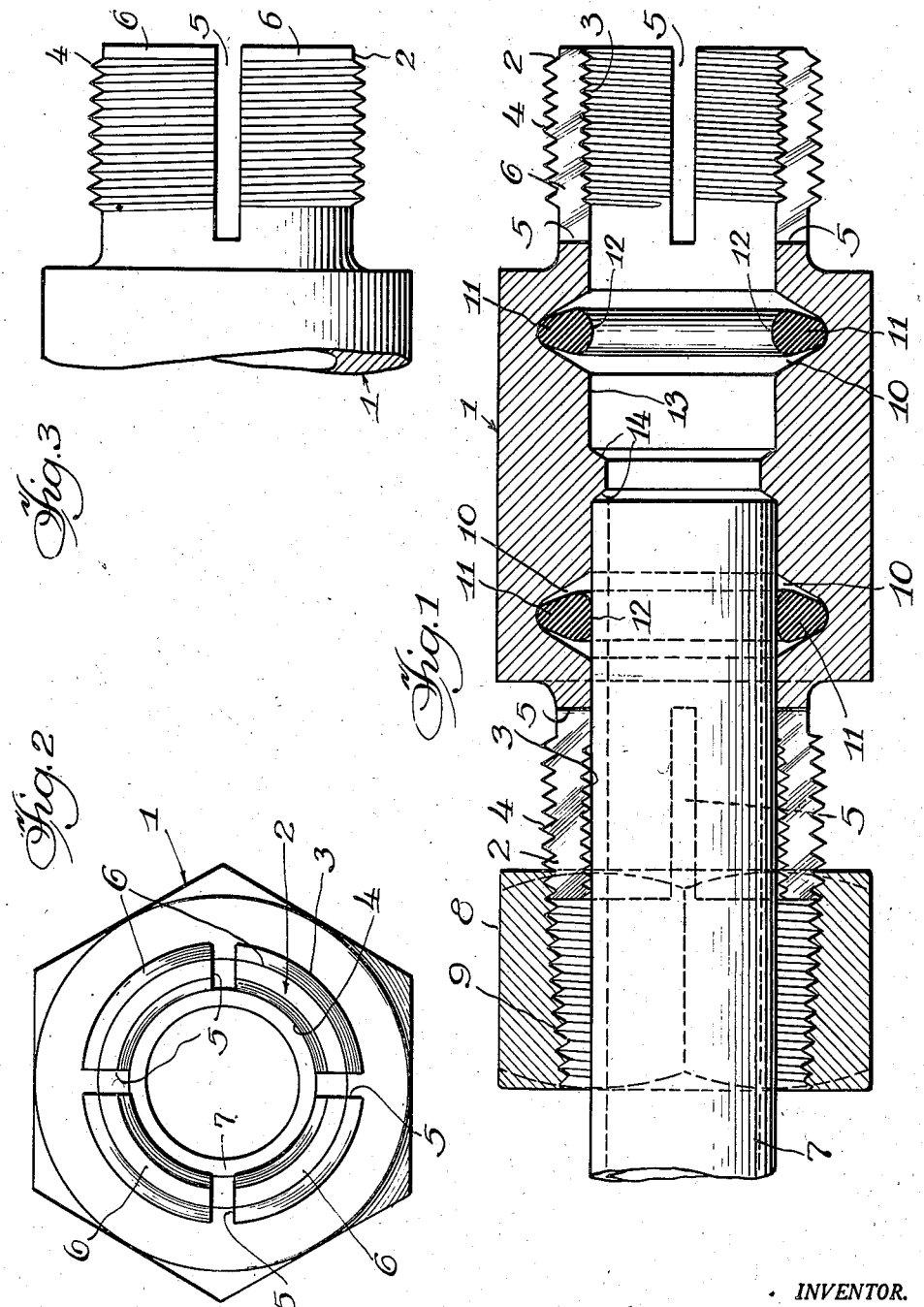
INVENTOR.
Thomas R. Smith,
Parkinson + Lane
Attys.

Patented Aug. 28, 1945

2,383,692

UNITED STATES PATENT OFFICE 2,383,692

PIPE OR TUBE COUPLING

Thomas R. Smith, Newton, Iowa, assignor to The Maytag Company, Newton, Iowa, a corporation of Delaware Application March 29, 1943, Serial No. 480,905

2 Claims. (Cl. 285—123)

The present invention relates to a novel coupling for joining adjacent ends of pipe or tube sections and for sealing these sections against leakage. Among the objects of the invention is to provide a novel tube coupling in which the adjoining tube or pipe sections are sealed by means of a resilient ring and retained in anchored position by means of threads or serrations engaging the outer circumference of the tube sections when the coupling is assembled.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in vertical cross section through a tube coupling constructed in accordance with the present invention with but one of the pipe or tube sections being shown in assembled relation and prior to the application of a locking nut.

Figure 2 is a view in end elevation of the tube coupling.

Figure 3 is a fragmentary view in side elevation of one end of the tube coupling.

Referring more particularly to the disclosure in the drawing, the novel coupling assembly comprises a tube coupling 1 which is shown in Figure 2 as formed of polygonal shape and with its opposite ends 2 serrated or threaded on the interior 3 and also threaded on the exterior 4. These ends are also slotted at 5 to allow the end segments 6 to be flexed or pressed down against the tube sections 7 and thereby anchor or lock these tube sections in their proper assembled position. This is accomplished by means of a lock nut 8 having its interior threaded at 9, and this threaded portion is tapered inwardly and outwardly so that when the nut is threaded onto the external threads 4 of the end segments 6, the internal serrations 3 of these end segments gradually engage and bite into the outer circumference of the tube section 7.

The central body of the tube coupling is provided with spaced inwardly opening substantially V-shaped channels or grooves 10 each adapted to receive a substantially wedge-shaped sealing element 11 formed of a resilient material such as natural or compounded synthetic rubber or the like. Excellent results have been secured by forming these substantially V-shaped grooves in a manner so that the opposed sides are disposed at an angle of approximately 60°, while the opposed sides of the sealing rings are disposed at an angle of approximately 45°. By making the angle of the sides of the substantially wedge-shaped sealing element less than that of the groove, each sealing element is permitted to slip or pivot from one side of the groove to the other about the radius of its vertex, with the vertex of each sealing element having a radius preferably slightly less than but approximately conforming to the radius of the curvature of the bottom of the groove. The sealing face 12 of the rings 11 is also curved or rounded in a manner so as to maintain substantially the same amount of squeeze or compression upon the surface of its tube section 7 as this sealing element slips or pivots within the groove. The corners of the sealing elements are also rounded so as to prevent their being pinched or extruded at their sealing edges between the surfaces being sealed.

As shown in Figure 1, the sealing face 12 when not under compression, extends or projects beyond the inner diameter 13 of the coupling body 1 so that as each tube section is inserted, proper sealing effect is obtained between the sealing ring and the surface of the tube section. Normally the tube section is inserted until its inner end engages the shoulder 14, but due to the sealing effect of the ring 11, these tube sections may move or shift longitudinally without affecting the sealing action.

From the above description and the disclosure in the drawing, it will be apparent that the present invention comprehends a novel manner of joining adjacent tube sections and sealing them against leakage of the fluid being carried.

Having thus disclosed the invention, I claim:

1. A coupling for joining the ends of tube or pipe sections, comprising a coupling body provided with a centrally disposed internal shoulder against which the sections abut and a substantially V-shaped recess disposed at a substantial distance from and to each side of the internal shoulder, projecting ends on the coupling each of which is provided with a threaded exterior and a serrated interior, an internally tapered lock nut threaded onto the exterior of the ends for forcing the serrations on each projecting end into the surface of a tube section for locking this section in the coupling, and a sealing ring in each recess for sealing the space between the interior of the coupling and a tube section.

2. A coupling for joining the ends of tube or pipe sections, comprising a coupling body for receiving the ends of the sections to be joined and provided with an internal shoulder against which the ends may engage and a pair of spaced recesses in the body each disposed a substantial distance from each side of the shoulder, serrations provided in a portion of the coupling body through which the sections are inserted, means for forcing these serrations into the tube sections to lock these sections against accidental or unintentional removal, and a resilient sealing ring carried in each recess and adapted to circumferentially engage each tube section for sealing against leakage of the fluid being carried, said recesses and sealing rings being so disposed that the sealing rings engage and seal against the tube sections even though the ends are spaced a substantial distance from the shoulder.

THOMAS R. SMITH.